(12) United States Patent
Golin et al.

(10) Patent No.: US 11,187,135 B2
(45) Date of Patent: Nov. 30, 2021

(54) VEHICLE EXHAUST SYSTEM

(71) Applicant: Tenneco Automotive Operating Company Inc., Lake Forest, IL (US)

(72) Inventors: Michael A. Golin, Ann Arbor, MI (US); Gabriel Ostromecki, Ann Arbor, MI (US); Frederick M. Baumgartner, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 163 days.

(21) Appl. No.: 16/443,179

(22) Filed: Jun. 17, 2019

(65) Prior Publication Data
US 2020/0392887 A1 Dec. 17, 2020

(51) Int. Cl.
*F01N 13/14* (2010.01)
*F01N 13/18* (2010.01)

(52) U.S. Cl.
CPC ....... *F01N 13/141* (2013.01); *F01N 13/1838* (2013.01)

(58) Field of Classification Search
CPC ............................ F01N 13/141; F01N 13/1838
USPC ........................................................ 138/142
See application file for complete search history.

(56) References Cited

U.S. PATENT DOCUMENTS

| 3,232,374 | A | * | 2/1966 | Powers | F01N 13/18 |
| | | | | | 181/245 |
| 4,315,644 | A | * | 2/1982 | Jansing | F16L 51/04 |
| | | | | | 285/179 |
| 7,918,310 | B1 | | 4/2011 | Helgeson et al. | |
| 8,341,953 | B2 | * | 1/2013 | Murakami | F01N 13/1872 |
| | | | | | 60/323 |
| 8,439,156 | B1 | | 5/2013 | Abram | |
| 10,787,943 | B2 | * | 9/2020 | Kishikawa | F01N 1/163 |
| 2007/0125594 | A1 | * | 6/2007 | Hill | F01N 1/084 |
| | | | | | 181/256 |
| 2008/0017444 | A1 | | 1/2008 | Dowdy | |
| 2019/0186332 | A1 | * | 6/2019 | Scanlon | F01N 13/1877 |
| 2020/0088078 | A1 | * | 3/2020 | Zuver | F01N 13/185 |

FOREIGN PATENT DOCUMENTS

| EP | 0068368 A1 * | 1/1983 | ......... F01N 13/1838 |
| EP | 3059407 A1 * | 8/2016 | ............. F01N 1/089 |

* cited by examiner

*Primary Examiner* — Craig M Schneider
*Assistant Examiner* — David R Deal
(74) *Attorney, Agent, or Firm* — McGarry Bair PC (57) ABSTRACT

A vehicle exhaust system includes a tubular component which allow passage of exhaust gases therethrough. The tubular component includes an upstream pipe having a first end and a second end. The tubular component further includes a downstream pipe having a third end and a fourth end. The third end of the downstream pipe at least partially encloses the second end of the upstream pipe such that the upstream pipe and the downstream pipe together define a junction region and the fourth end defines a primary exhaust gas flow path. The downstream pipe at least partially defines an opening within the junction region such that the opening provides a secondary exhaust gas flow path.

22 Claims, 8 Drawing Sheets

VEHICLE EXHAUST SYSTEM

TECHNICAL FIELD

The present disclosure relates to a vehicle exhaust system. More specifically, the present disclosure relates to damping of sound generated by the vehicle exhaust system.

BACKGROUND

A vehicle exhaust system directs exhaust gas generated by an internal combustion engine to external environment. The exhaust system may include various components, such as pipes, converters, catalysts, filters, and the like. During operation of the exhaust system, as a result of resonating frequencies, the components may generate undesirable noise. Different methods have been employed in various applications to address this issue.

For example, the components, such as mufflers, resonators, valves, and the like, have been incorporated into the exhaust system to attenuate certain resonance frequencies generated by the exhaust system. However, such additional components are expensive and increase weight of the exhaust system. Also, adding new components into the exhaust system introduce new sources of undesirable noise generation.

A well-known sound attenuating method is a Standing Wave Management (SWM) technology. The SWM includes an opening provided on an exhaust pipe. The opening provides a secondary exhaust leak path for sound to exit the exhaust pipe and minimizes leakage of the exhaust gas through the opening. The SWM utilizes a series of holes to allow sound waves to exit the exhaust pipe while limiting leakage of the exhaust gas. In some instances, the holes may be covered with a microperforated material to dampen the noise. In order to achieve a desired noise attenuation, the holes have to be relatively large in size.

However, the microperforated material is very thin and is not as structurally sound as a solid pipe wall of the exhaust pipe. As such, creating holes in the microperforated material may adversely affect durability of the microperforated material. Additionally, if relatively larger holes are cut into the exhaust pipe and covered with the microperforated material, durability of the exhaust pipe may also be adversely affected. Another concern is with grazing flow that may occur across a surface of the microperforated material. The acoustic properties of the microperforated material may change when the exhaust gas flows across the surface of the microperforated material. This may often reduce an ability of an acoustic wave to propagate through the micro perforations, which may limit the damping effect.

Additionally, the SWM has a well-known failure mode when debris, such as salt or mud, may plug the opening. The SWM may include multilayer parts where the debris may accumulate behind the multilayer parts and result in premature failure of the SWM. Also, for efficient functioning of the SWM, a desired diameter size of each of the series of holes may have to be less than 1 millimeter (mm). However, conventional manufacturing methods make it difficult to produce a 1 mm diameter hole in a material thicker than 1 mm. More specifically, durability of the component may be compromised if component thickness may be limited to 1 mm.

An example is provided by a U.S. patent which discloses a vehicle exhaust system including an exhaust component having an outer surface and an inner surface that defines an internal exhaust component cavity. At least one hole is formed in the exhaust component to extend through a wall of the exhaust component from the outer surface to the inner surface. A member is formed from a resistive material and is configured to overlap the at least one hole. At least one spacer is configured to space the member away from the inner or outer surface of the exhaust component to create an open cavity between the member and the exhaust component. In one example, an actuator is configured to cover and uncover the member dependent upon an operating characteristic to vary damping.

Hence, there is a need for an improved vehicle exhaust system for such applications.

SUMMARY

In an aspect of the present disclosure, a vehicle exhaust system including a tubular component is provided. The tubular component allows passage of exhaust gases therethrough. The tubular component includes an upstream pipe having a first end and a second end. The tubular component further includes a downstream pipe having a third end and a fourth end. The third end of the downstream pipe at least partially encloses the second end of the upstream pipe such that the upstream pipe and the downstream pipe together define a junction region and the fourth end defines a primary exhaust gas flow path. The downstream pipe at least partially defines one or more openings within the junction region such that the one or more openings provides a secondary exhaust gas flow path.

In another aspect of the present disclosure, a vehicle exhaust system includes a tubular component for a vehicle exhaust system is provided. The tubular component includes an upstream pipe having a first end and a second end. The tubular component includes a downstream pipe having a third end and a fourth end. The third end of the downstream pipe at least partially encloses the second end of the upstream pipe such that the upstream pipe and the downstream pipe together define a junction region. The downstream pipe further defines an opening within the junction region such that the opening provides a leakage path for the exhaust gases.

In yet another aspect of the present disclosure, a method of assembling a tubular component for a vehicle exhaust system is provided. The method includes providing an upstream pipe having a first end and a second end. The method includes providing a downstream pipe having a third end and a fourth end. The downstream pipe defines an opening defining a secondary exhaust gas flow path for exhaust gases therein. The method includes coupling the second end of the upstream pipe with the third end of the downstream pipe to define a junction region such that the opening defining the secondary exhaust gas flow path is within the junction region. The method further includes welding the upstream pipe and the downstream pipe together.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

Figure 1:
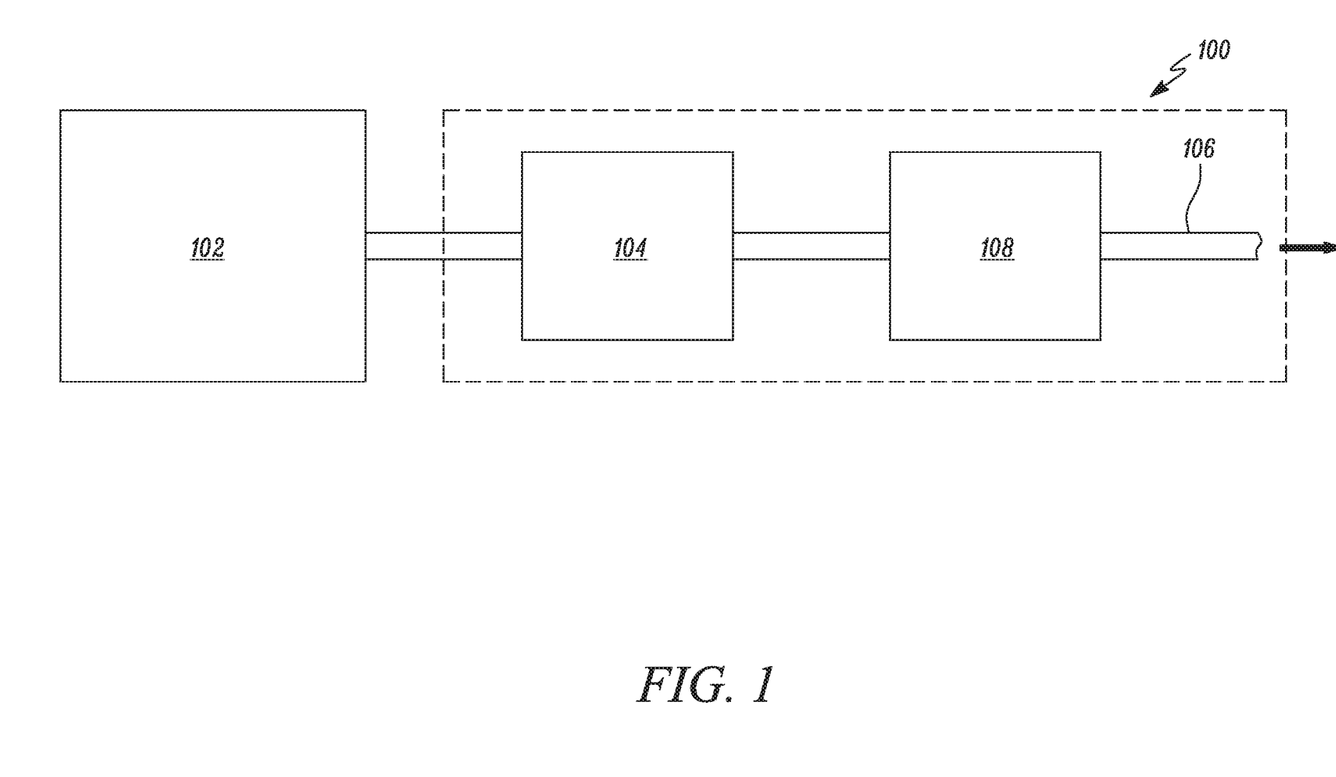
FIG. 1 is a schematic representation of a vehicle exhaust system, according to an aspect of the present disclosure.

The following description of the preferred embodiment(s) is merely exemplary in nature and is in no way intended to limit the invention, its application, or uses. Referring now to the drawings in which like reference numerals designate like or corresponding parts throughout the several views, there is shown in FIG. 1. Referring to FIG. 1, a schematic representation of a vehicle exhaust system 100 is illustrated. The vehicle exhaust system 100 will be hereinafter interchangeably referred to as the "system 100". The system 100 is fluidly coupled to an engine 102. The engine 102 may be any internal combustion engine powered by a fuel, such as diesel, gasoline, natural gas, and/or a combination thereof. Accordingly, the system 100 receives exhaust gas generated by the engine 102.

The system 100 includes a number of downstream exhaust components 104 fluidly coupled to the engine 102. The exhaust components 104 may include a number of systems/components (not shown), such as a Diesel Oxidation Catalyst (DOC), a Diesel Exhaust Fluid (DEF) unit, a Selective Catalytic Reduction (SCR) unit, a particulate filter, an exhaust pipe, and the like. The exhaust components 104 may be mounted in various different configurations and combinations based on application requirements and/or available packaging space. The exhaust components 104 are adapted to receive the exhaust gas from the engine 102 and direct the exhaust gas to the external atmosphere via a tailpipe 106. The exhaust components 104 are adapted to reduce emissions and control noise.

The system 100 also includes an acoustic damping member, such as a muffler 108. The muffler 108 is provided in fluid communication with the exhaust components 104 and the tailpipe 106. In the illustrated embodiment, the muffler 108 is disposed downstream of the exhaust components 104 and upstream of the tailpipe 106. In other embodiments, the muffler 108 may be disposed in any sequence with respect to each of the exhaust components 104 and/or the tailpipe 106, based on application requirements. The muffler 108 is adapted to dampen resonance frequencies generated during operation of the engine 102 and the system 100.

Figure 2:
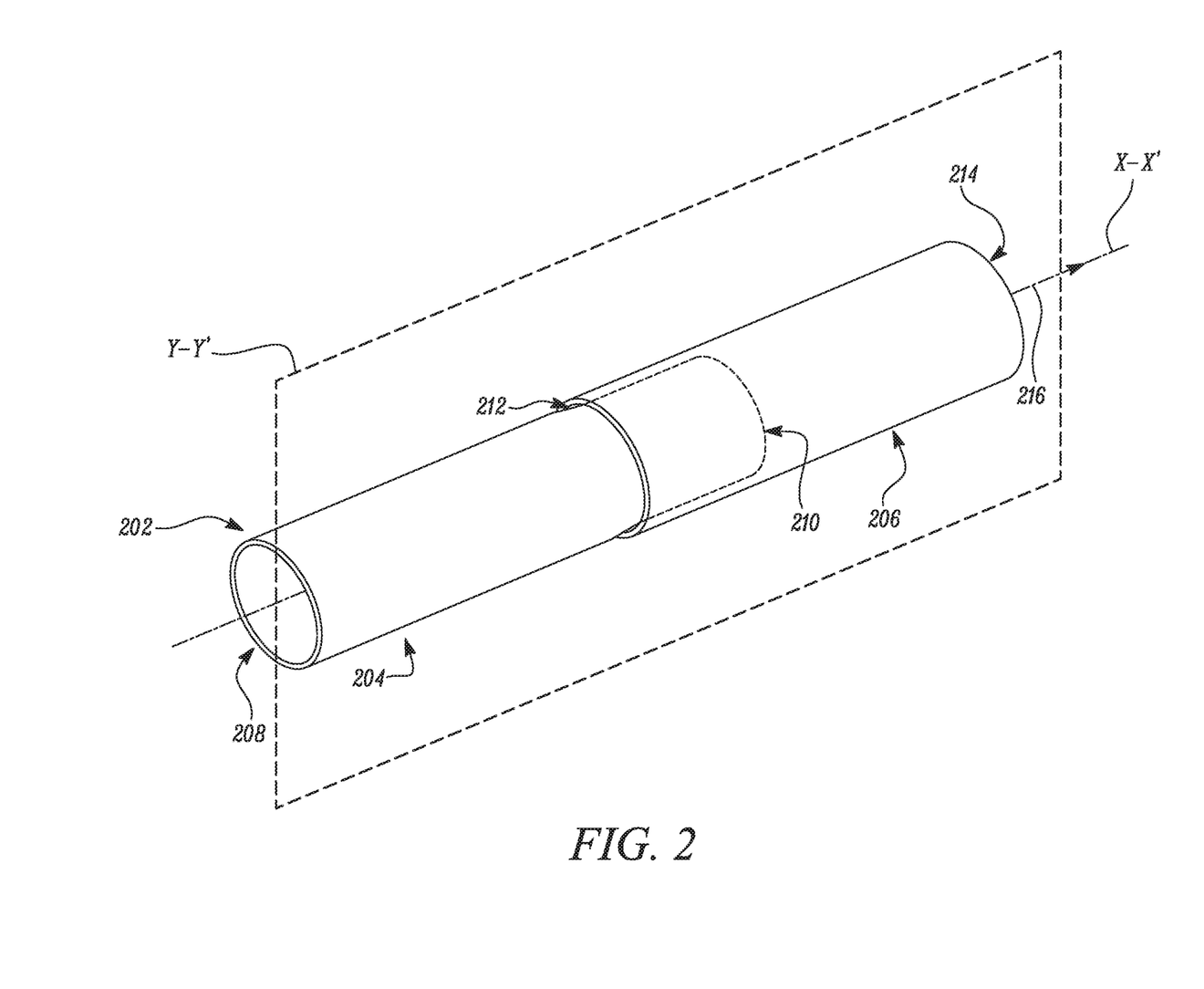
FIG. 2 is a perspective view of a tubular component of the vehicle exhaust system of FIG. 1, according to an aspect of the present disclosure.

Referring to FIG. 2, a perspective view of an exemplary tubular component 202 associated with the system 100 is illustrated. In the illustrated embodiment, the tubular component 202 is the muffler 108. In other embodiments, the tubular component 202 may be any one or more of the exhaust components 104 and/or any portion of the system 100, such as the exhaust pipe, the tailpipe 106, and the like. The tubular component 202 has a substantially hollow and cylindrical configuration defining a central axis X-X'.

The tubular component 202 includes an upstream pipe 204 and a downstream pipe 206. The upstream pipe 204 and the downstream pipe 206 may have any shape such as an X-pipe, a Y-pipe or any other suitable shape which may be applicable with various aspects of the present disclosure. The upstream pipe 204 has a first end 208 and a second end 210. The first end 208 may be construed as an inlet end and the second end 210 may be construed as an outlet end for the upstream pipe 204. Exhaust gases flow through the upstream pipe 204 from the first end 208 to the second end 210. Similarly, the downstream pipe 206 has a third end 212 and a fourth end 214. The third end 212 may be construed as an inlet end and the fourth end 214 may be construed as an outlet end for the downstream pipe 206. Exhaust gases flow through the downstream pipe 206 from the third end 212 to the fourth end 214.

A primary exhaust gas flow path 216 is defined at the fourth end 214 of the downstream pipe 206. Exhaust gases enter the tubular component 202 at the first end 208 of the upstream pipe 204 and exit through the fourth end 214 of the downstream pipe 206 defining the primary exhaust gas flow path 216. The fourth end 214 of the downstream pipe 206 may be further coupled to any other suitable component of the vehicle exhaust system 100 as per application requirements. The present disclosure is not limited by any such components in any manner.

The upstream pipe 204 and the downstream pipe 206 are coupled to each other. In an embodiment, the upstream pipe 204 and the downstream pipe 206 are coupled to each other through welding. In other embodiments, the upstream pipe 204 and the downstream pipe 206 may be coupled to each other through any other suitable mechanical joining techniques and the present disclosure is not limited by means of joining of the upstream pipe 204 and the downstream pipe 206 in any manner.

Figure 3:
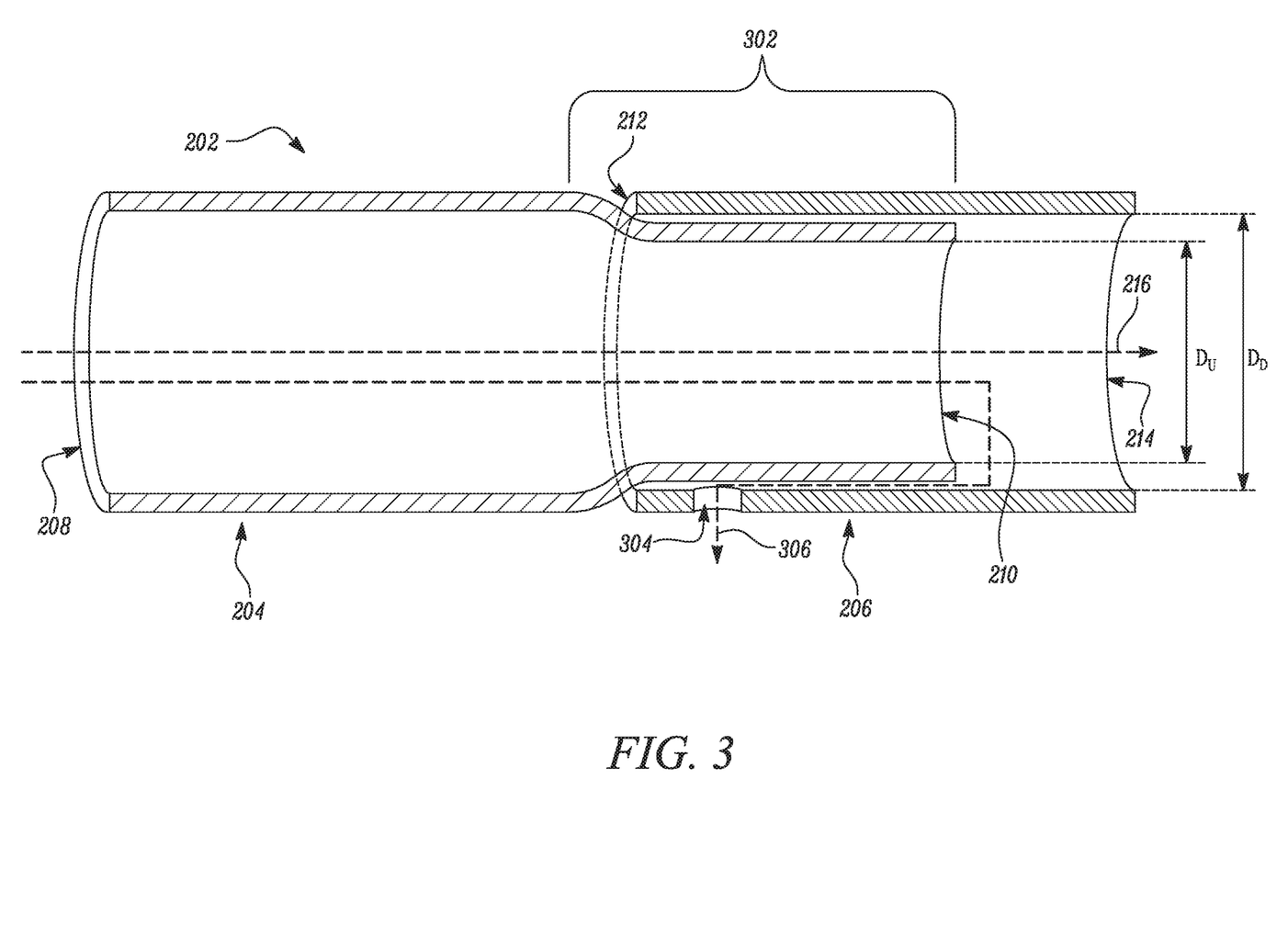
FIG. 3 is a sectional view of the tubular component shown in FIG. 2, according to an aspect of the present disclosure.

FIG. 2 further shows a sectional plane Y-Y'. The sectional plane Y-Y' passes through the central axis X-X' and virtually divides the tubular component into two identical halves. FIG. 3 shows sectional view of the tubular component 202 along the plane Y-Y'. The third end 212 of the downstream pipe 206 at least partially encloses the second end 210 of the upstream pipe 204. The upstream pipe 204 and the downstream pipe 206 together define a junction region 302. The junction region 302 extends across overlapping extent of both the upstream pipe 204 and the downstream pipe 206. A diameter $D_U$ of the upstream pipe 204 at the second end 210 may be smaller than a diameter $D_D$ of the downstream pipe 206 at the third end 212 to facilitate at least partial enclosure of the upstream pipe 204 by the downstream pipe 206. It should be contemplated that the diameters of the upstream pipe 204 and the downstream pipe 206 are substantially equal apart from the junction region 302.

The downstream pipe 206 at least partially defines an opening within the junction region 302. In the illustrated embodiment, the downstream pipe 206 defines one opening 304. The opening 304 provides a secondary exhaust gas flow path 306 for the exhaust gases. A volume of the exhaust gases flowing through the secondary exhaust gas flow path 306 is less than a volume of the exhaust gases flowing through the primary exhaust gas flow path. The upstream pipe 206 has a round shape and has a straight profile in the junction region 302. In an embodiment, the junction region 302 may be filled with a wire mesh (not shown).

Figure 4A:
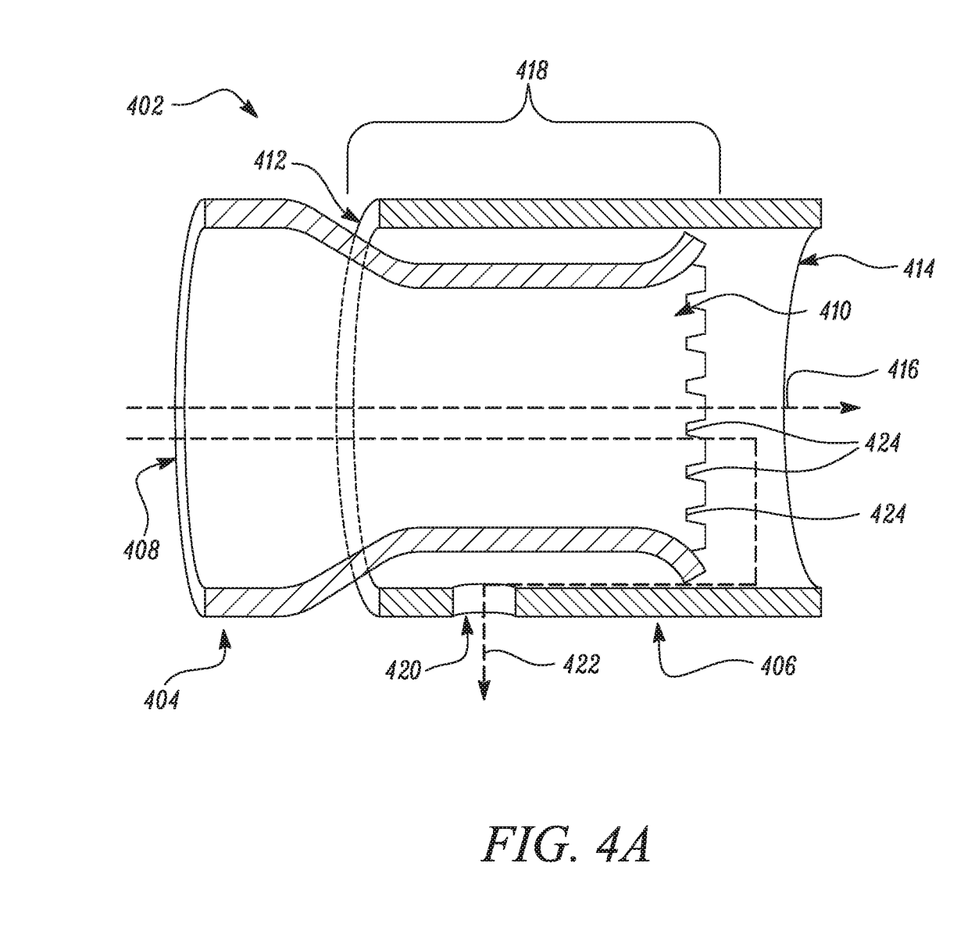
FIG. 4A is a sectional view of another tubular component, according to another aspect of the present disclosure.

FIG. 4A illustrates another embodiment of the present disclosure. A sectional view of another tubular component 402 is illustrated. The tubular component 402 includes an upstream pipe 404 and a downstream pipe 406. The upstream pipe 404 has a first end 408 and a second end 410. Similarly, the downstream pipe 406 has a third end 412 and a fourth end 414. A primary exhaust gas flow path 416 is defined at the fourth end 414 of the downstream pipe 406. Exhaust gases enter the tubular component 402 at the first end 408 of the upstream pipe 404 and exit through the fourth end 414 of the downstream pipe 406 defining the primary exhaust gas flow path 416. The fourth end 414 of the downstream pipe 406 may be further coupled to any other suitable component of the vehicle exhaust system 100 as per application requirements. The present disclosure is not limited by any such components in any manner. The second end 410 of the upstream pipe 404 and the third end 412 of the downstream pipe 406 are joined together to define a junction region 418. In an embodiment, the junction region 418 may be filled with a wire mesh (not shown). It should be contemplated that diameters of the upstream pipe 404 and the downstream pipe 406 are substantially equal apart from the junction region 418.

Figure 4B:
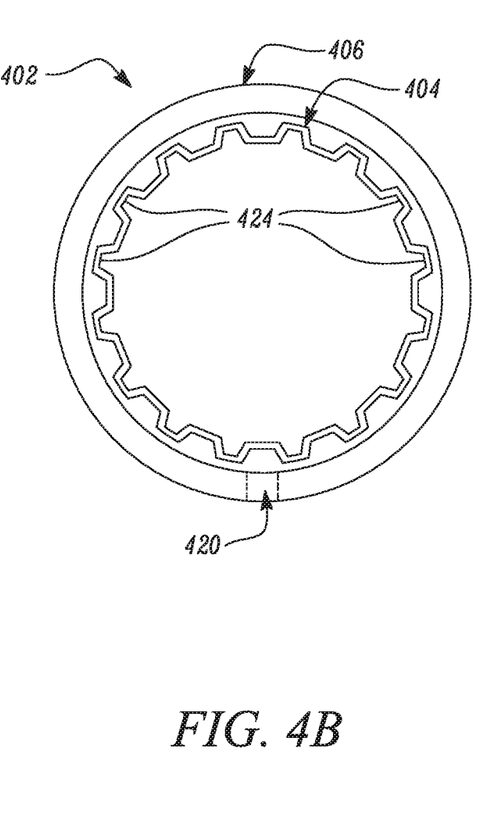
FIG. 4B is a side view of the tubular component of FIG. 4A, according to an aspect of the present disclosure.

The downstream pipe 406 at least partially defines an opening within the junction region 418. In the illustrated embodiment, the downstream pipe defines one opening 420. The opening 420 provides a secondary exhaust gas flow path 422 for the exhaust gases. A volume of the exhaust gases flowing through the secondary exhaust gas flow path 422 is less than a volume of the exhaust gases flowing through the primary exhaust gas flow path 416. The upstream pipe 404 has a straight section at the second end 410. The upstream pipe 404 defines at least one notch along a periphery of the upstream pipe 404 at the second end 410. In the illustrated embodiment, the upstream pipe 404 defines multiple notches 424. FIG. 4B illustrates a side view of the tubular component 402. The upstream pipe 404 includes the notches 424 along the periphery of the upstream pipe 404. Due to the notches 424, the upstream pipe 404 has a fluted structure at the second end 410. In an embodiment, the secondary exhaust gas flow path 422 may be a slot located at an edge of the third end 412 of the downstream pipe 406.

Figure 5A:
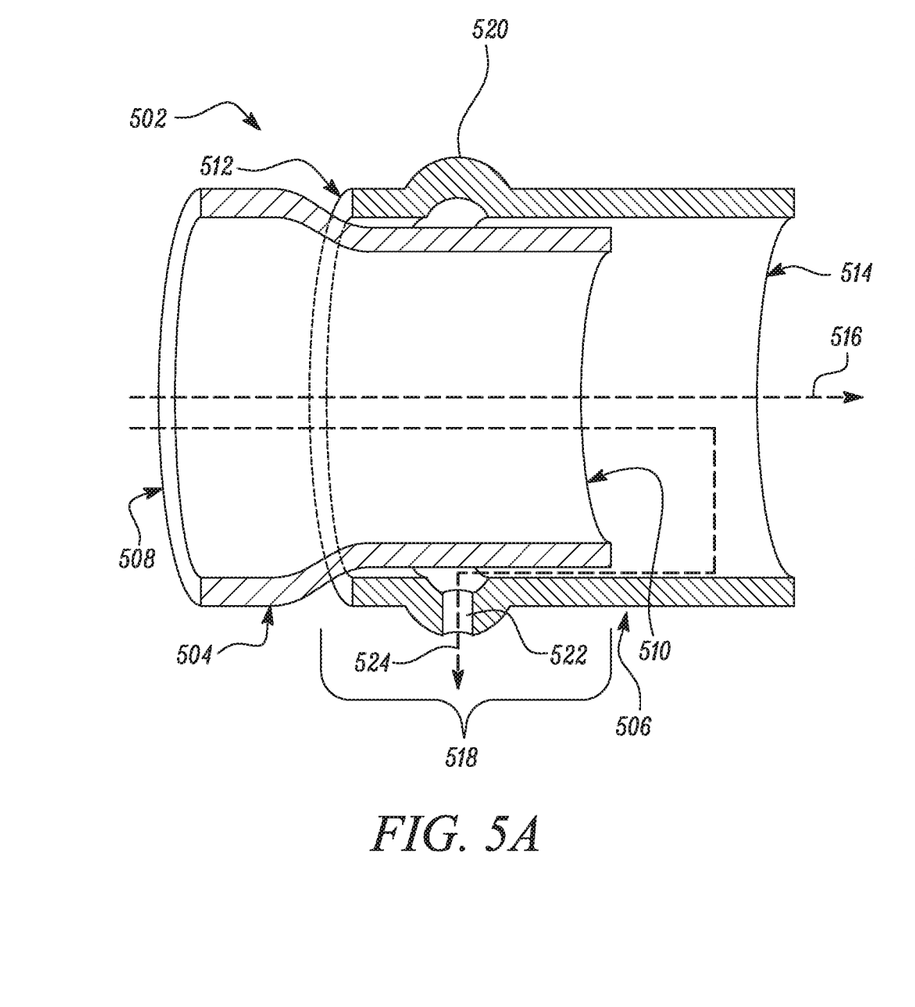
FIG. 5A is a sectional view of another tubular component, according to another aspect of the present disclosure.
Figure 5B:
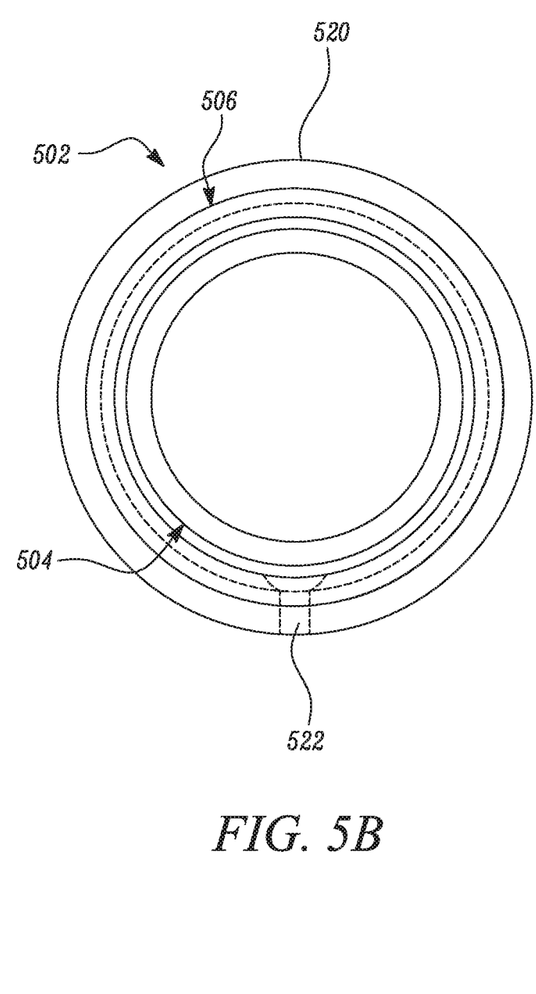
FIG. 5B is a side view of the tubular component of FIG. 5A, according to an aspect of the present disclosure.

FIG. 5A illustrates another embodiment of the present disclosure. A sectional view of another tubular component 502 is illustrated. The tubular component 502 includes an upstream pipe 504 and a downstream pipe 506. The upstream pipe 504 has a first end 508 and a second end 510. Similarly, the downstream pipe 506 has a third end 512 and a fourth end 514. A primary exhaust gas flow path 516 is defined at the fourth end 514 of the downstream pipe 506. Exhaust gases enter the tubular component 502 at the first end 508 of the upstream pipe 504 and exit through the fourth end 514 of the downstream pipe 506 defining the primary exhaust gas flow path 516. The fourth end 514 of the downstream pipe 506 may be further coupled to any other suitable component of the vehicle exhaust system 100 as per application requirements. The present disclosure is not limited by any such components in any manner. The second end 510 of the upstream pipe 504 and the third end 512 of the downstream pipe 506 are joined together to define a junction region 518. In an embodiment, the junction region 518 may be filled with a wire mesh (not shown). It should be contemplated that diameters of the upstream pipe 504 and the downstream pipe 506 are substantially equal apart from the junction region 518.

The upstream pipe 504 has a straight section at the second end 510. The downstream pipe 506 defines a raised collar 520 at least partially along the periphery of the downstream pipe 506. In the illustrated embodiment, the raised collar 520 runs all along the periphery of the downstream pipe 506. The raised collar 520 is defined within the junction region 518. In the illustrated embodiment, the raised collar 520 has a partial circular configuration. However, the raised collar 520 may have any other configuration as well and the present disclosure is not limited by structural configuration of the raised collar 520 in any manner. Further, the downstream pipe 506 at least partially defines an opening within the junction region 518. In the illustrated embodiment, the downstream pipe 506 defines one opening 522. The opening 522 is defined within the raised collar 520. The opening 522 provides a secondary exhaust gas flow path 524 for the exhaust gases. A volume of the exhaust gases flowing through the secondary exhaust gas flow path 524 is less than a volume of the exhaust gases flowing through the primary exhaust gas flow path 516. In an embodiment, the secondary exhaust flow path 524 may be a slot located at an edge of the third end 512 of the downstream pipe 506.

Figure 6A:
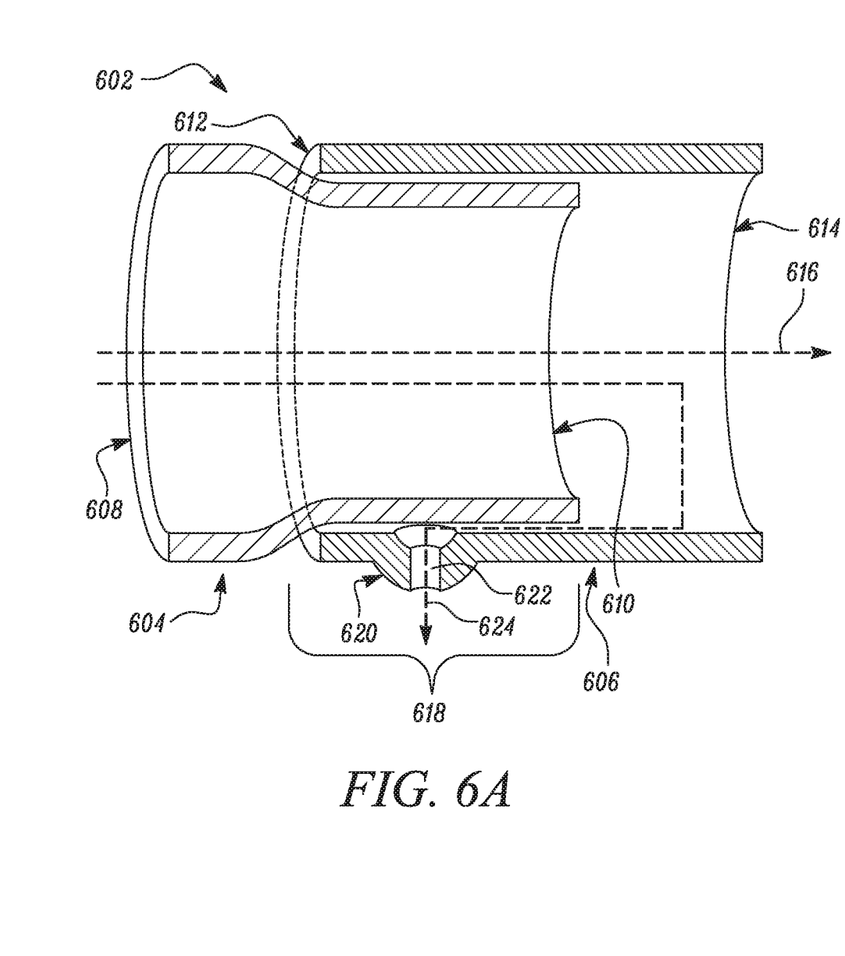
FIG. 6A is a sectional view of another tubular component, according to another aspect of the present disclosure.

FIG. 6A illustrates another embodiment of the present disclosure. A sectional view of another tubular component 602 is illustrated. The tubular component 602 includes an upstream pipe 604 and a downstream pipe 606. The upstream pipe 604 has a first end 608 and a second end 610. Similarly, the downstream pipe 606 has a third end 612 and a fourth end 614. A primary exhaust gas flow path 616 is defined at the fourth end 614 of the downstream pipe 606. Exhaust gases enter the tubular component 602 at the first end 608 of the upstream pipe 604 and exit through the fourth end 614 of the downstream pipe 606 defining the primary exhaust gas flow path 616. The fourth end 614 of the downstream pipe 606 may be further coupled to any other suitable component of the vehicle exhaust system 100 as per application requirements. The present disclosure is not limited by any such components in any manner. The second end 610 of the upstream pipe 604 and the third end 612 of the downstream pipe 606 are joined together to define a junction region 618. In an embodiment, the junction region 618 may be filled with a wire mesh (not shown). It should be contemplated that diameters of the upstream pipe 604 and the downstream pipe 606 are substantially equal apart from the junction region 618.

Figure 6B:
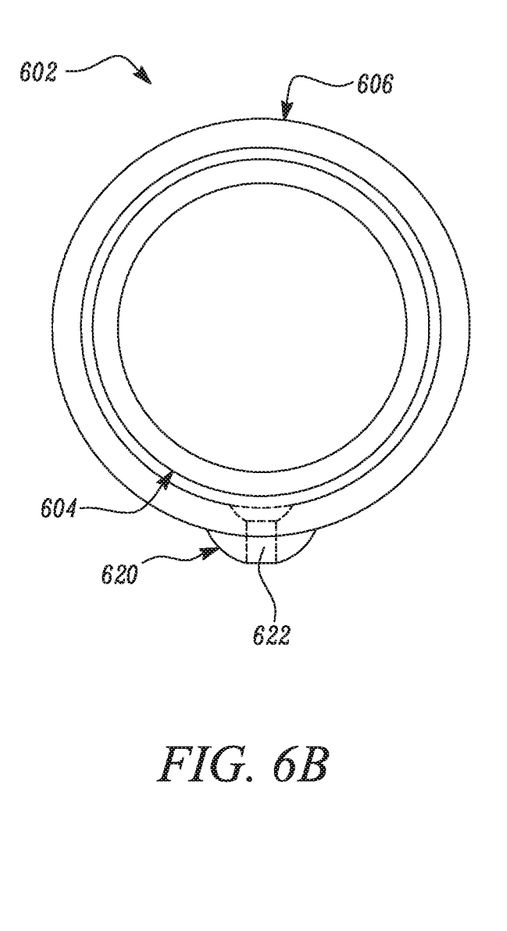
FIG. 6B is a side view of the tubular component of FIG. 6A, according to an aspect of the present disclosure.

The upstream pipe 604 has a straight section at the second end 610. The downstream pipe 606 defines a raised trough 620 towards a bottom of the downstream pipe 606. The raised trough 620 is defined within the junction region 618. In the illustrated embodiment, the raised trough 620 has a partial circular configuration. However, the raised trough 620 may have any other configuration as well and the present disclosure is not limited by structural configuration of the raised trough 620 in any manner. Further, the downstream pipe 606 at least partially defines an opening within the junction region 618. In the illustrated embodiment, the downstream pipe 606 defines one opening 622. The opening 622 is defined within the raised trough 620. FIG. 6B further illustrates the opening 622 defined within the raised trough 620. The opening 622 provides a secondary exhaust gas flow path 624 for the exhaust gases. A volume of the exhaust gases flowing through the secondary exhaust gas flow path 624 is less than a volume of the exhaust gases flowing through the primary exhaust gas flow path 616. In an embodiment, the secondary exhaust flow path 624 may be a slot located at an edge of the third end 612 of the downstream pipe 606.

Figure 7A:
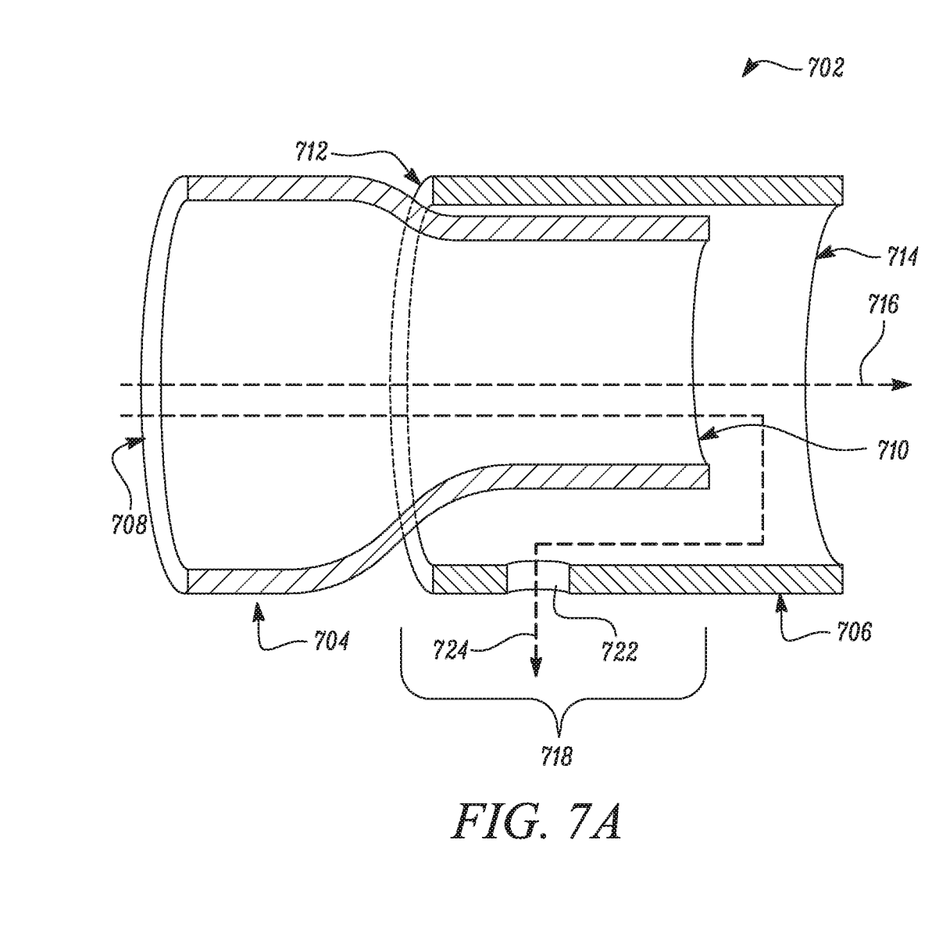
FIG. 7A is a sectional view of another tubular component, according to another aspect of the present disclosure.

FIG. 7A illustrates another embodiment of the present disclosure. A sectional view of another tubular component 702 is illustrated. The tubular component 702 includes an upstream pipe 704 and a downstream pipe 706. The upstream pipe 704 has a first end 708 and a second end 710. Similarly, the downstream pipe 706 has a third end 712 and a fourth end 714. A primary exhaust gas flow path 716 is defined at the fourth end 714 of the downstream pipe 706. Exhaust gases enter the tubular component 702 at the first end 708 of the upstream pipe 704 and exit through the fourth end 714 of the downstream pipe 706 defining the primary exhaust gas flow path 716. The fourth end 714 of the downstream pipe 706 may be further coupled to any other suitable component of the vehicle exhaust system 100 as per application requirements. The present disclosure is not limited by any such components in any manner. The second end 710 of the upstream pipe 704 and the third end 712 of the downstream pipe 706 are joined together to define a junction region 718. In an embodiment, the junction region 718 may be filled with a wire mesh (not shown). It should be contemplated that diameters of the upstream pipe 704 and the downstream pipe 706 are substantially equal apart from the junction region 718.

The upstream pipe 704 has a D-shaped section at the second end 710 within the junction region 718. The downstream pipe 706 defines at least one opening 722 within the junction region 718. The opening 722 provides a secondary exhaust gas flow path 724 for the exhaust gases. The downstream pipe 706 further defines another opening (not shown) within the junction region 718 disposed diametrically opposed to the opening 722 such that the another opening is plugged by the D-shaped section of the upstream pipe 704. The downstream pipe 706 may then be plug welded using the another opening as support for a weld bead. The another opening may be disposed diametrically opposite to the opening 722 within the downstream pipe 706. In an embodiment, the secondary exhaust gas flow path 724 may be a slot located at an edge of the third end 712 of the downstream pipe 706.

Figure 7B:
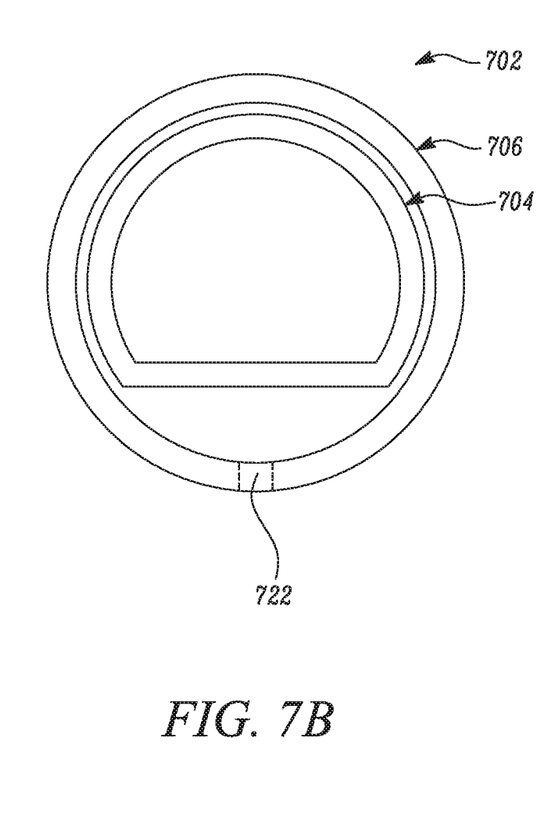
FIG. 7B is a side view of the tubular component of FIG. 7A, according to an aspect of the present disclosure.

FIG. 7B illustrates a side view of the tubular component 702. A volume of the exhaust gases flowing through the secondary exhaust gas flow path 724 is less than a volume of the exhaust gases flowing through the primary exhaust gas flow path 716.

Figure 8:
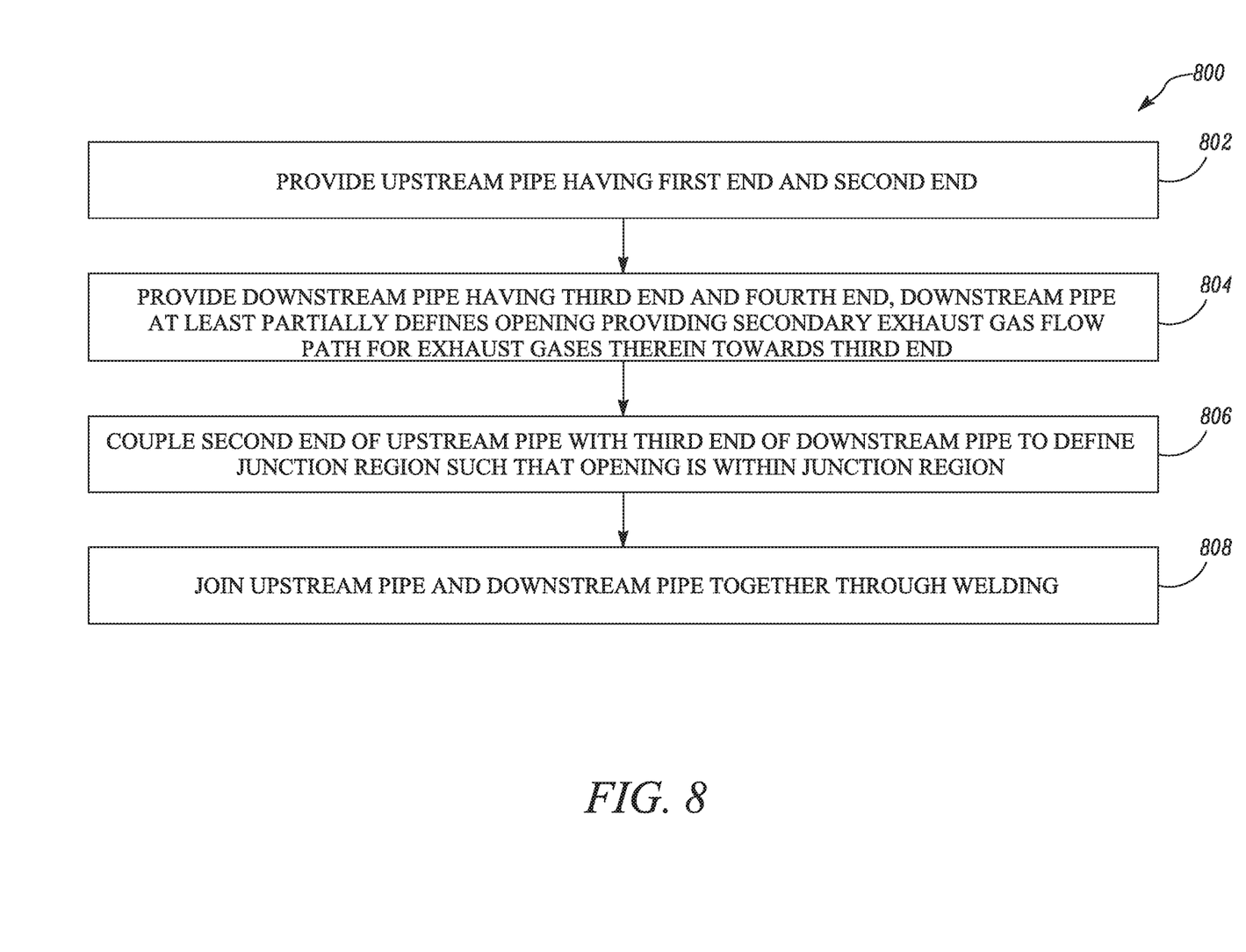
FIG. 8 is a flow chart illustrating steps of a method of assembling a tubular component, according to an aspect of the present disclosure.

FIG. 8 illustrates a method 800 for assembling a tubular component for a vehicle exhaust system. At step 802, the method 800 includes providing an upstream pipe having a first end and a second end. At step 804, the method 800 includes providing a downstream pipe having a third end and a fourth end. The fourth end of the downstream pipe defines a primary exhaust gas flow path. The downstream pipe at least partially defines an opening providing a secondary exhaust gas flow path for exhaust gases therein towards the third end. Such exemplary upstream pipe and downstream pipe have been illustrated with help of FIGS. 3-7. At step 806, the method 800 includes coupling the second end of the upstream pipe with the third end of the downstream pipe to define a junction region such that the opening is within the junction region. Such exemplary configurations have been illustrated with help of FIGS. 3-7. At step 808, the method 800 further includes welding the upstream pipe and the downstream pipe together.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A vehicle exhaust system comprising:
a tubular component adapted to allow passage of exhaust gases therethrough, the tubular component comprising:
an upstream pipe having a first end and a second end; the second end of the upstream pipe defining at least one notch;
a downstream pipe having a third end and a fourth end, wherein the third end of the downstream pipe at least partially encloses the second end of the upstream pipe such that the upstream pipe and the downstream pipe together define a junction region and the fourth end defines a primary exhaust gas flow path; and
wherein the downstream pipe at least partially defines one or more openings within the junction region such that the one or more openings provide a secondary exhaust gas flow path.

2. The vehicle exhaust system of claim 1, wherein the downstream pipe defines a raised collar extending at least partially along a circumference of the downstream pipe within the junction region such that the one or more openings are defined within the raised collar.

3. The vehicle exhaust system of claim 1, wherein the downstream pipe defines a raised trough within the junction region such that the one or more openings are defined within the raised trough.

4. The vehicle exhaust system of claim 1, wherein:
the upstream pipe defines a D-shaped section within the junction region;
the downstream pipe further defines another opening within the junction region disposed diametrically opposed to the one or more openings such that the another opening is plugged by the D-shaped section of the upstream pipe.

5. The vehicle exhaust system of claim 1, wherein a diameter of the downstream pipe at the third end is greater than a diameter of the upstream pipe at the second end.

6. The vehicle exhaust system of claim 1, wherein the upstream pipe and the downstream pipe are joined together by welding.

7. The vehicle exhaust system of claim 1, wherein the tubular component is a tailpipe.

8. The vehicle exhaust system of claim 1, wherein a volume of exhaust gases flowing through the primary exhaust gas flow path is greater than a volume of exhaust gases flowing through the secondary exhaust gas flow path.

9. A tubular component for a vehicle exhaust system comprising:
an upstream pipe having a first end and a second end; the second end of the upstream pipe defining at least one notch;
a downstream pipe having a third end and a fourth end, wherein the third end of the downstream pipe at least partially encloses the second end of the upstream pipe such that the upstream pipe and the downstream pipe together define a junction region; and
wherein the downstream pipe further defines an opening within the junction region such that the opening provides a leakage path for exhaust gases.

10. The tubular component of claim 9, wherein the downstream pipe defines a raised collar extending at least partially along a circumference of the downstream pipe within the junction region such that the opening is defined within the raised collar.

11. The tubular component of claim 9, wherein the downstream pipe defines a raised trough within the junction region such that the opening is defined within the raised trough.

12. The tubular component of claim 9, wherein:
the upstream pipe defines a D-shaped section within the junction region;
the downstream pipe further defines another opening within the junction region disposed diametrically opposed to the opening such that the another opening is plugged by the D-shaped section of the upstream pipe.

13. The tubular component of claim 9, wherein a diameter of the downstream pipe at the third end is greater than a diameter of the upstream pipe at the second end.

14. The tubular component of claim 9, wherein the upstream pipe and the downstream pipe are joined together by welding.

15. The tubular component of claim 9, wherein the tubular component is a tailpipe.

16. The tubular component of claim 9, wherein the fourth end defines a primary exhaust gas flow path and wherein the one opening within the junction region defines a secondary exhaust gas flow path such that a volume of exhaust gases flowing through the primary exhaust gas flow path is greater than a volume of exhaust gases flowing through the secondary exhaust gas flow path.

17. A vehicle exhaust system comprising:
a tubular component adapted to allow passage of exhaust gases therethrough, the tubular component comprising:
an upstream pipe having a first end and a second end;
a downstream pipe having a third end and a fourth end, wherein the third end of the downstream pipe at least partially encloses the second end of the upstream pipe such that the upstream pipe and the downstream pipe together define a junction region and the fourth end defines a primary exhaust gas flow path;
wherein the downstream pipe at least partially defines one or more openings within the junction region such that the one or more openings provide a secondary exhaust gas flow path; and
wherein the downstream pipe defines a raised collar extending at least partially along a circumference of the downstream pipe within the junction region such that the one or more openings are defined within the raised collar.

18. A vehicle exhaust system comprising:
a tubular component adapted to allow passage of exhaust gases therethrough, the tubular component comprising:
an upstream pipe having a first end and a second end;
a downstream pipe having a third end and a fourth end, wherein the third end of the downstream pipe at least partially encloses the second end of the upstream pipe such that the upstream pipe and the downstream pipe together define a junction region and the fourth end defines a primary exhaust gas flow path;
wherein the downstream pipe at least partially defines one or more openings within the junction region such that the one or more openings provide a secondary exhaust gas flow path; and
wherein the downstream pipe defines a raised trough within the junction region such that the one or more openings are defined within the raised trough.

19. A vehicle exhaust system comprising:
a tubular component adapted to allow passage of exhaust gases therethrough, the tubular component comprising:
an upstream pipe having a first end and a second end;
a downstream pipe having a third end and a fourth end, wherein the third end of the downstream pipe at least partially encloses the second end of the upstream pipe such that the upstream pipe and the downstream pipe together define a junction region and the fourth end defines a primary exhaust gas flow path; and
wherein the downstream pipe at least partially defines one or more openings within the junction region such that the one or more openings provide a secondary exhaust gas flow path; and
wherein the upstream pipe defines a D-shaped section within the junction region; and the downstream pipe further defines another opening within the junction region disposed diametrically opposed to the one or more openings such that the another opening is plugged by the D-shaped section of the upstream pipe.

20. A tubular component for a vehicle exhaust system comprising:
an upstream pipe having a first end and a second end;
a downstream pipe having a third end and a fourth end, wherein the third end of the downstream pipe at least partially encloses the second end of the upstream pipe such that the upstream pipe and the downstream pipe together define a junction region;
wherein the downstream pipe further defines an opening within the junction region such that the opening provides a leakage path for exhaust gases; and
wherein the downstream pipe defines a raised collar extending at least partially along a circumference of the downstream pipe within the junction region such that the opening is defined within the raised collar.

21. A tubular component for a vehicle exhaust system comprising:
an upstream pipe having a first end and a second end;
a downstream pipe having a third end and a fourth end, wherein the third end of the downstream pipe at least partially encloses the second end of the upstream pipe such that the upstream pipe and the downstream pipe together define a junction region;
wherein the downstream pipe further defines an opening within the junction region such that the opening provides a leakage path for exhaust gases; and
wherein the downstream pipe defines a raised trough within the junction region such that the opening is defined within the raised trough.

22. A tubular component for a vehicle exhaust system comprising:
an upstream pipe having a first end and a second end;
a downstream pipe having a third end and a fourth end, wherein the third end of the downstream pipe at least partially encloses the second end of the upstream pipe such that the upstream pipe and the downstream pipe together define a junction region;
wherein the downstream pipe further defines an opening within the junction region such that the opening provides a leakage path for exhaust gases; and
wherein the upstream pipe defines a D-shaped section within the junction region and the downstream pipe further defines another opening within the junction region disposed diametrically opposed to the opening such that the another opening is plugged by the D-shaped section of the upstream pipe.

* * * * *